US009914601B2

(12) United States Patent
Morency et al.

(10) Patent No.: US 9,914,601 B2
(45) Date of Patent: Mar. 13, 2018

(54) METHOD AND TOOL FOR PALLETIZING MIXED LOAD PRODUCTS

(71) Applicant: Symbotic Canada, ULC, Montréal (CA)

(72) Inventors: Sylvain-Paul Morency, Laval (CA); Marc Ducharme, Boucherville (CA); Robert Jodoin, Mont Tremblant (CA); Regis Metivier, Montréal (CA); Jean-François Forget, Montréal (CA); Maxime Lamy-Poirier, Montréal (CA); Eric Lajoie, Montréal (CA)

(73) Assignee: Symbotic, Canada ULC. (CA)

( * ) Notice: Subject to any disclaimer, the term of this patent is extended or adjusted under 35 U.S.C. 154(b) by 0 days.

(21) Appl. No.: 15/645,840

(22) Filed: Jul. 10, 2017

(65) Prior Publication Data

US 2017/0305692 A1    Oct. 26, 2017

Related U.S. Application Data

(63) Continuation of application No. 14/704,581, filed on May 5, 2015, now Pat. No. 9,701,490.

(60) Provisional application No. 61/988,398, filed on May 5, 2014.

(51) Int. Cl.
| | | |
|---|---|---|
| *B66C 1/42* | (2006.01) | |
| *B65G 61/00* | (2006.01) | |
| *B65G 47/90* | (2006.01) | |
| *B65G 57/03* | (2006.01) | |
| *B25J 11/00* | (2006.01) | |
| *B65G 47/82* | (2006.01) | |
| *B25J 15/00* | (2006.01) | |
| *B65G 63/00* | (2006.01) | |

(52) U.S. Cl.
CPC ............... *B65G 61/00* (2013.01); *B25J 11/00* (2013.01); *B25J 15/0014* (2013.01); *B65G 47/82* (2013.01); *B65G 47/90* (2013.01); *B65G 47/905* (2013.01); *B65G 57/03* (2013.01); *B65G 63/002* (2013.01); *B65G 2201/025* (2013.01)

(58) Field of Classification Search
CPC ........ B65G 61/00; B65G 47/82; B65G 47/90; B65G 47/905; B65G 57/03; B65G 63/002; B65G 2201/025; B25J 11/00; B25J 15/0014; B25J 15/02
USPC ............... 294/103.1, 86.4; 414/789.9, 792.7, 414/790.2, 792.9, 799
See application file for complete search history.

(56) References Cited

U.S. PATENT DOCUMENTS

| | | |
|---|---|---|
| 4,541,771 A | 9/1985 | Beni et al. |
| 4,707,013 A | 11/1987 | Vranish et al. |
| 6,082,797 A | 7/2000 | Antonette |
| 6,579,053 B1 | 6/2003 | Grams et al. |
| 7,938,614 B2 | 5/2011 | Fritzsche |
| 7,967,354 B2 | 6/2011 | Faulkner et al. |
| 8,235,436 B2 | 8/2012 | Ryf |
| 8,267,452 B2 | 9/2012 | Weber |
| 8,414,044 B2 | 4/2013 | Weber |

(Continued)

*Primary Examiner* — Gabriela M Puig
(74) *Attorney, Agent, or Firm* — Perman & Green, LLP

(57) ABSTRACT

The problem of the lag time in picking and dropping mixed load products during a palletization process is solved by using a tool having i) a gripping member that can be partially closed in a first fast movement while it is moved by a robot towards a product and then closed onto the product in a second shorter movement and ii) a product abutting plate that is movable in unison with the tool in opposite direction thereof as the tool is moved by a robot towards and away the mixed load pallet.

24 Claims, 14 Drawing Sheets

(56) References Cited

U.S. PATENT DOCUMENTS

| | | |
|---|---|---|
| 8,602,473 B2 | 12/2013 | Weber |
| 8,632,110 B2 | 1/2014 | Waizenegger |
| 8,807,912 B2 | 8/2014 | Liebheit |
| 9,011,074 B2 | 4/2015 | Diehr et al. |
| 2008/0267759 A1 | 10/2008 | Morency et al. |
| 2010/0218464 A1 | 9/2010 | Baumann |
| 2015/0246444 A1 | 9/2015 | Guidi et al. |

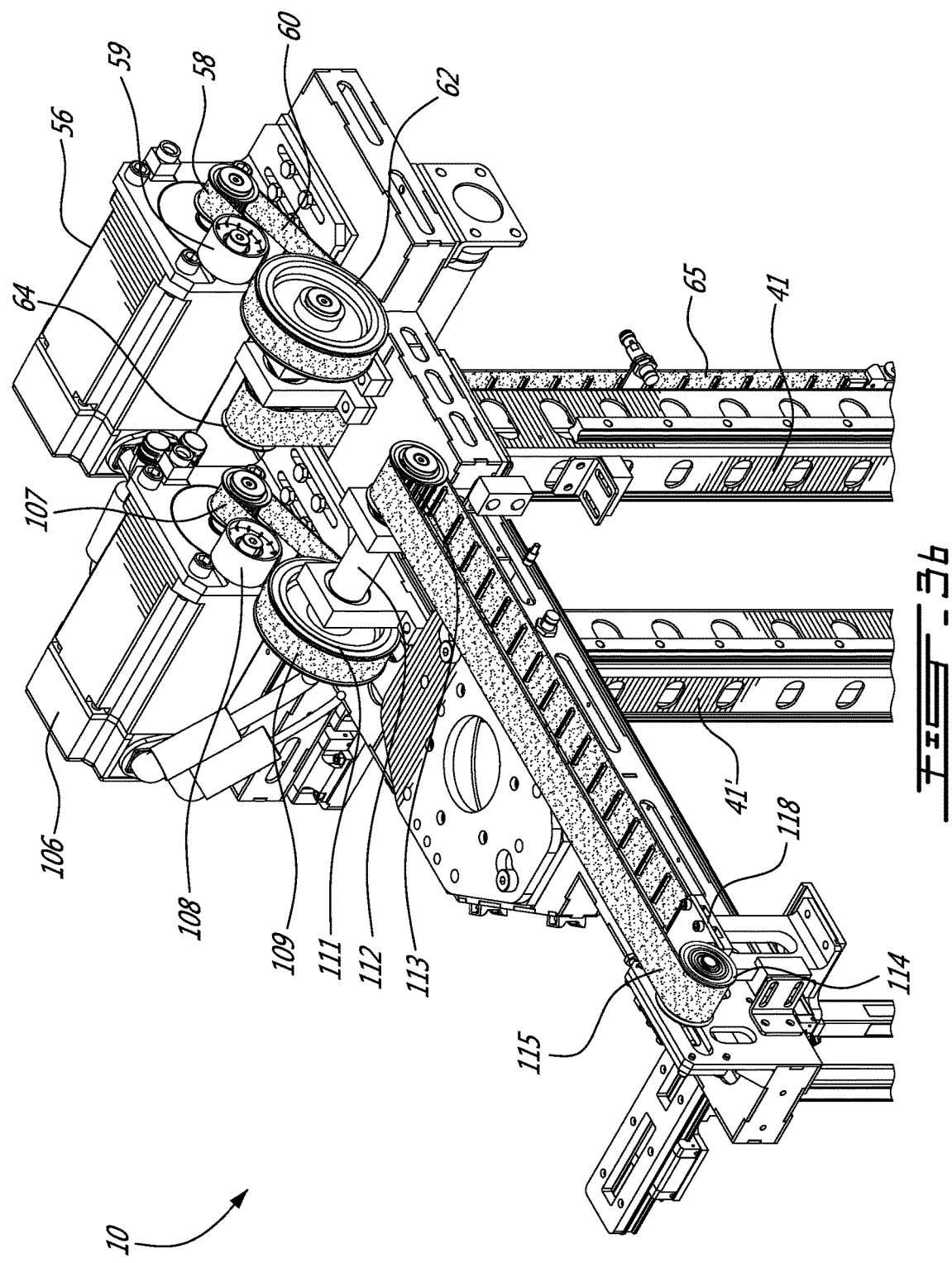

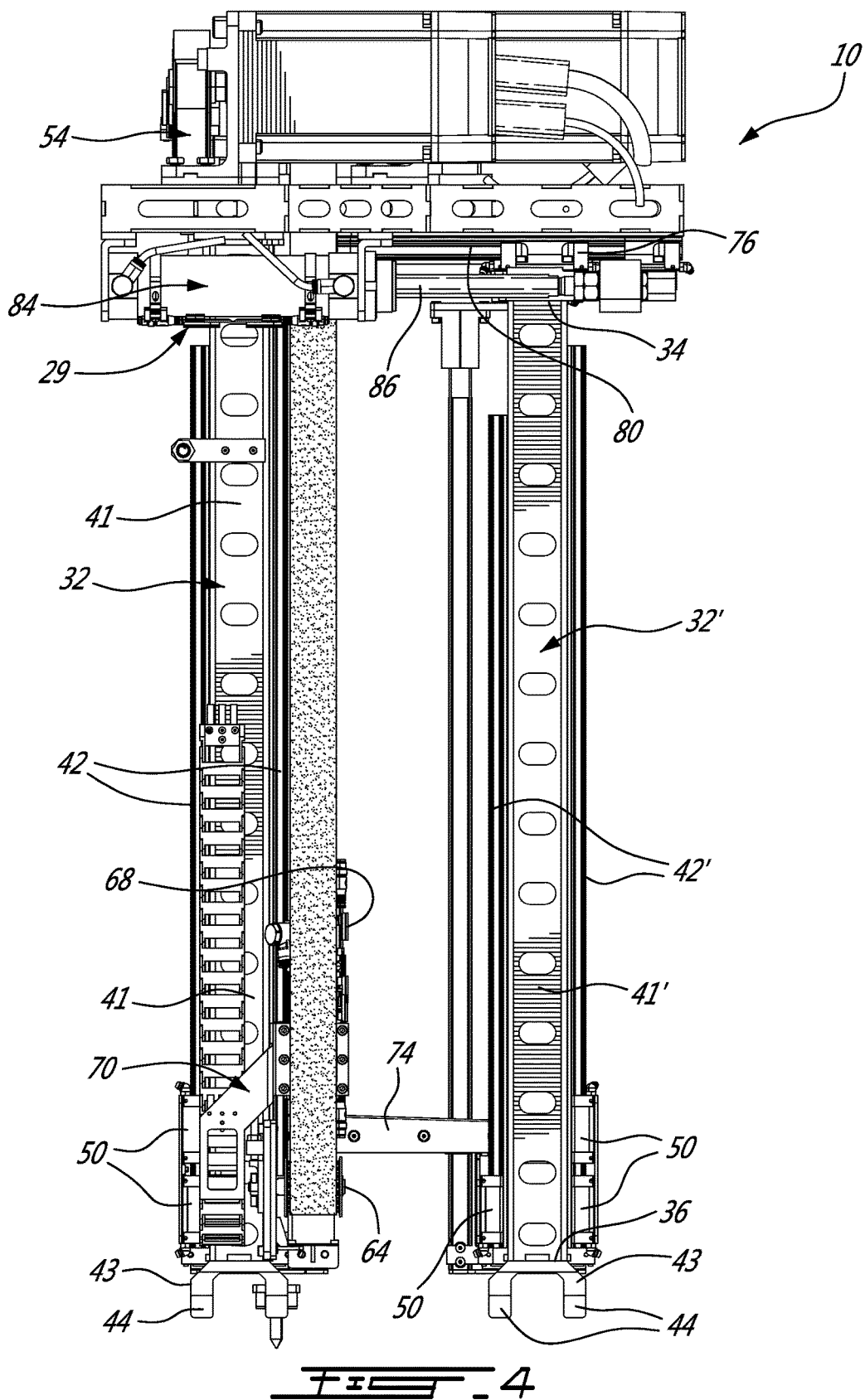

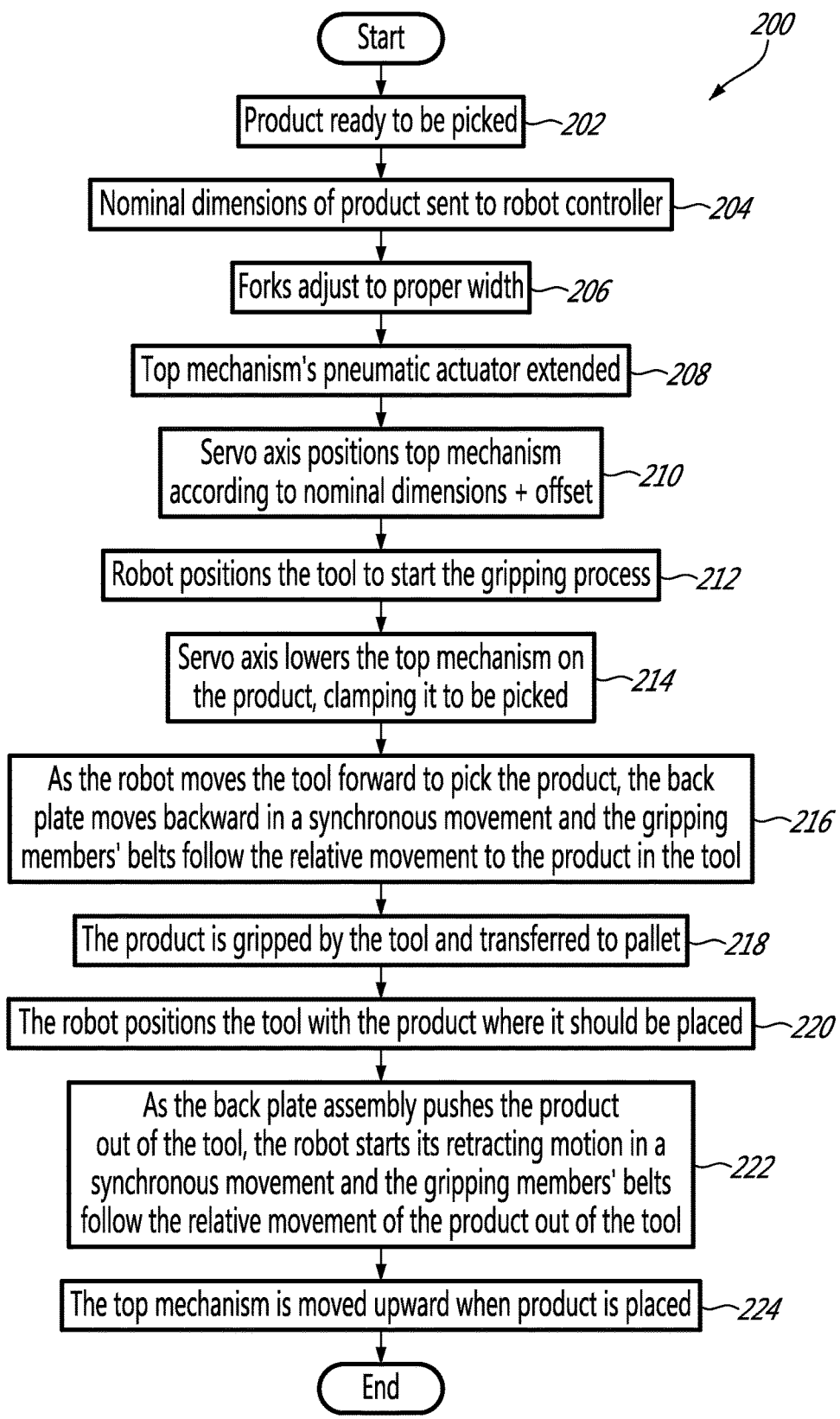

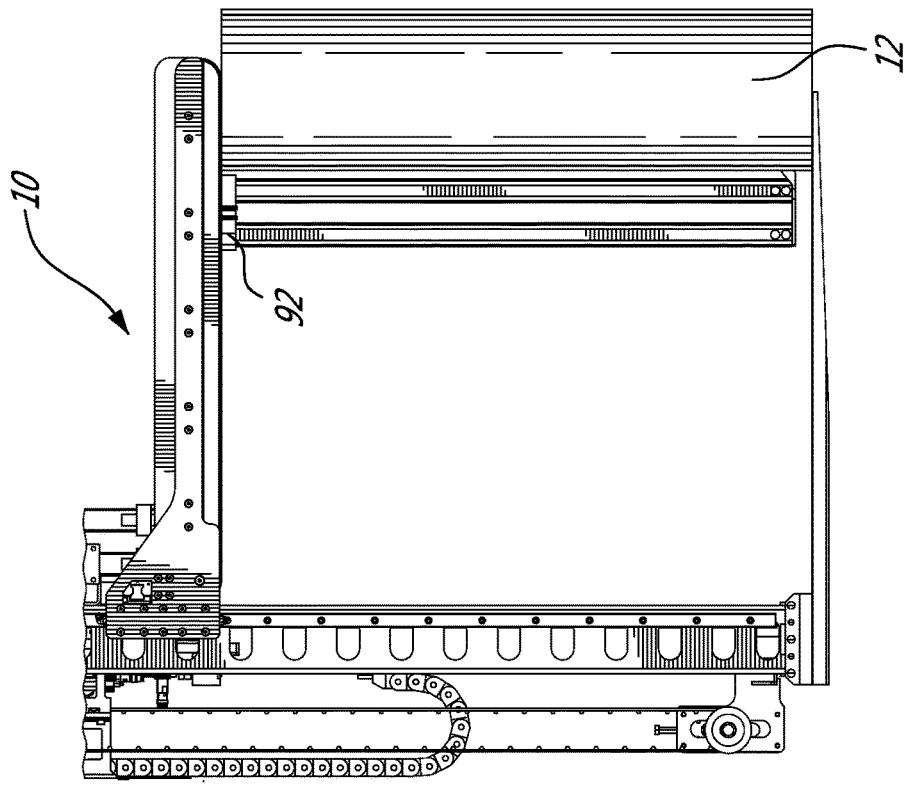
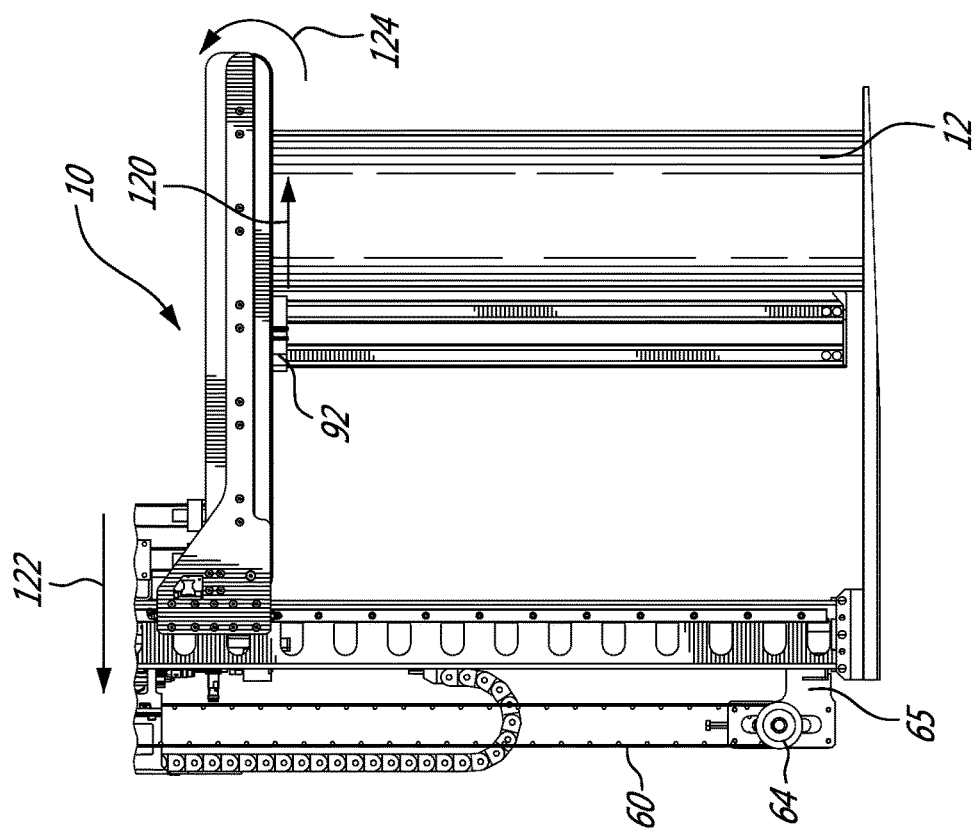

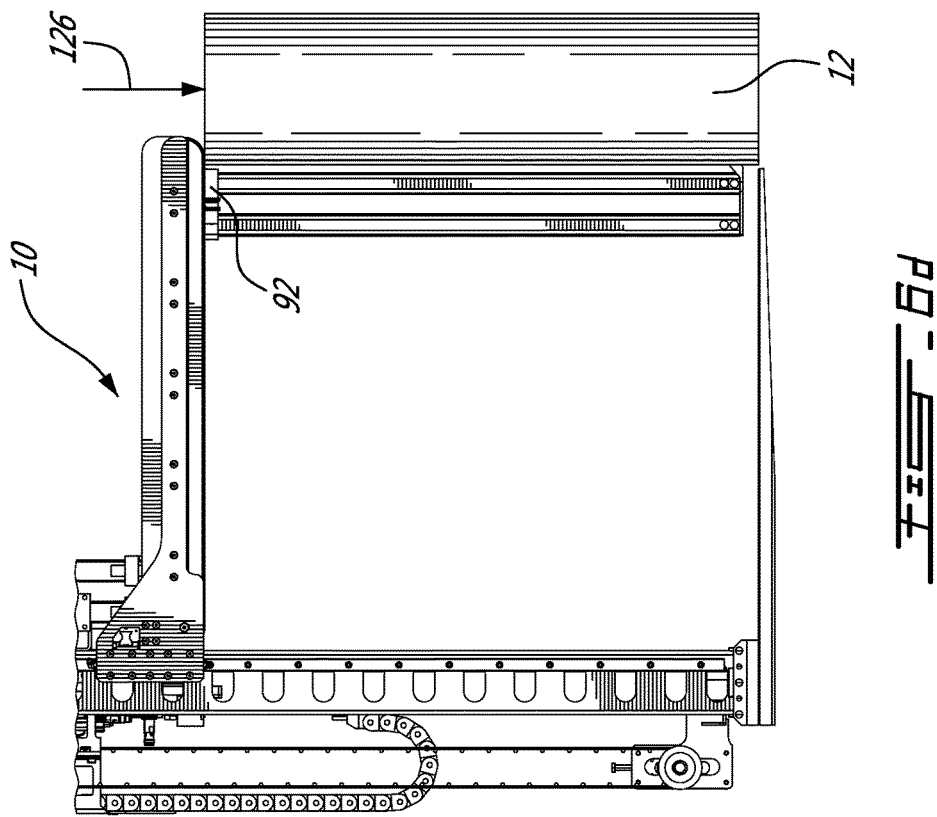
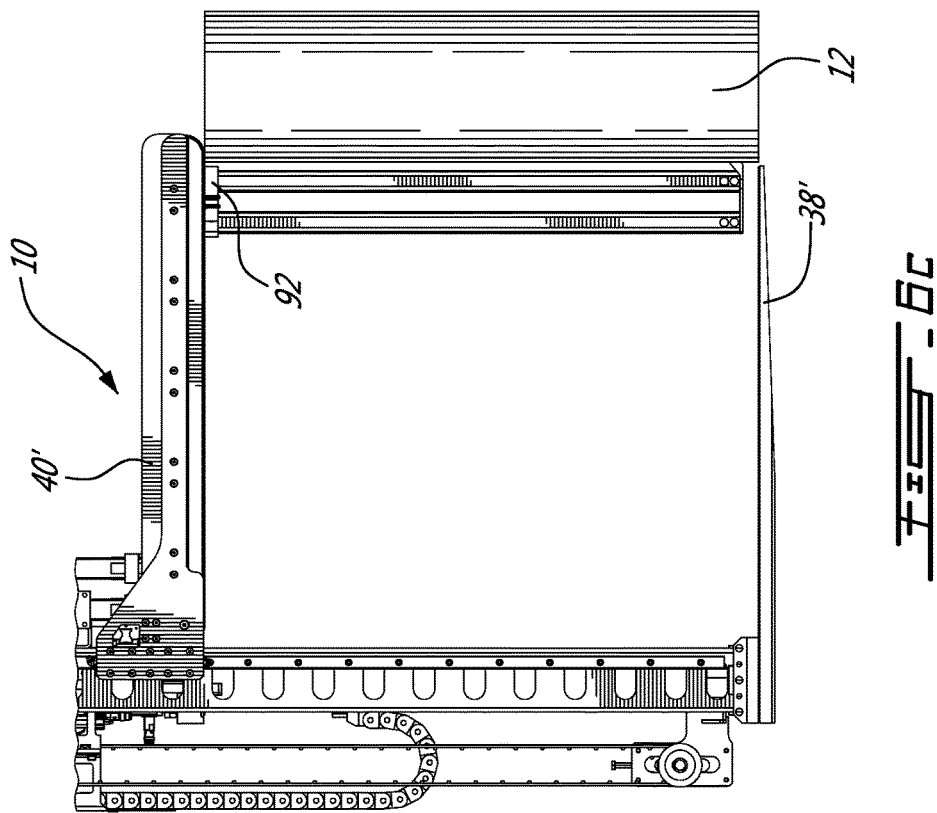

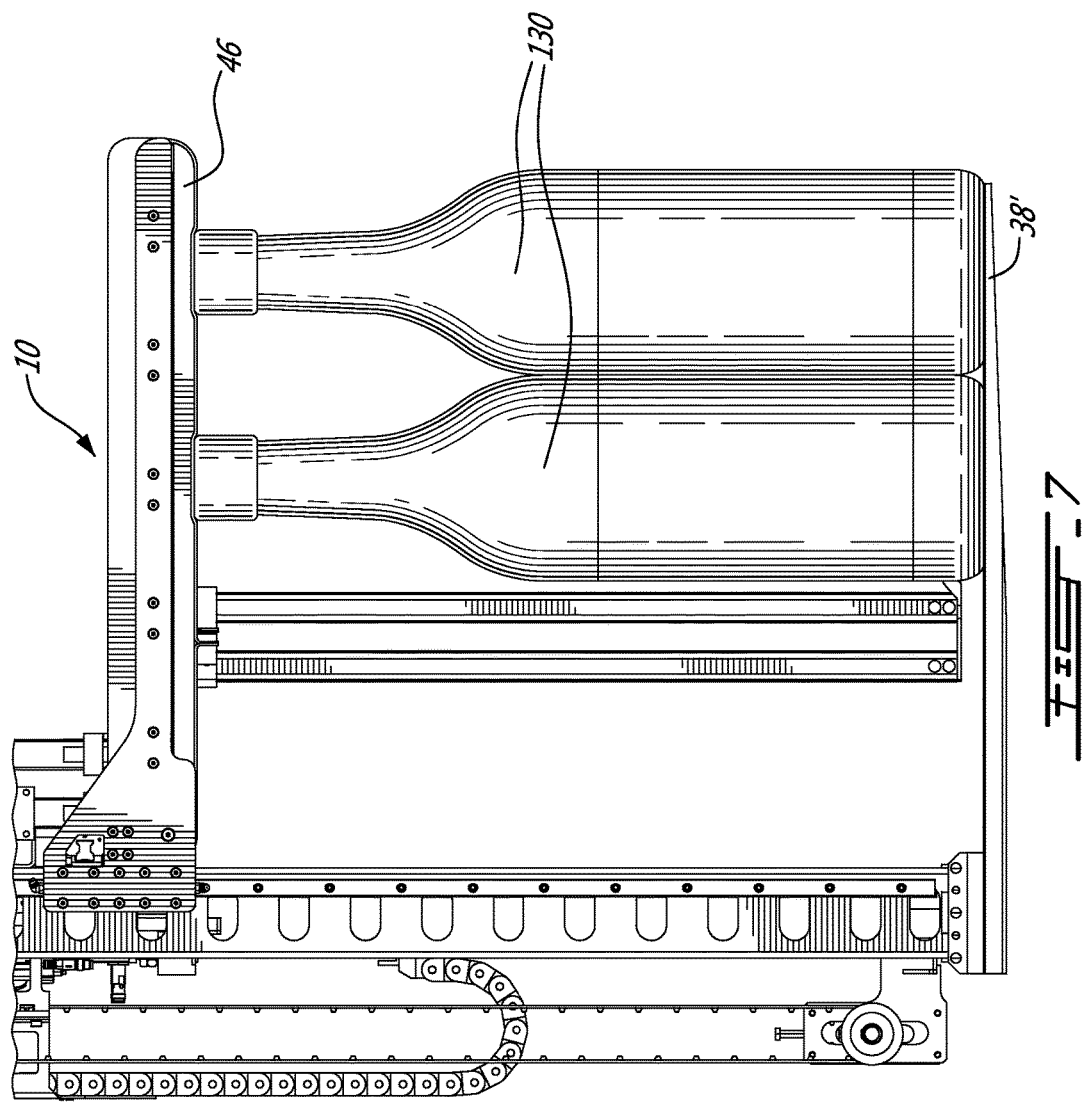

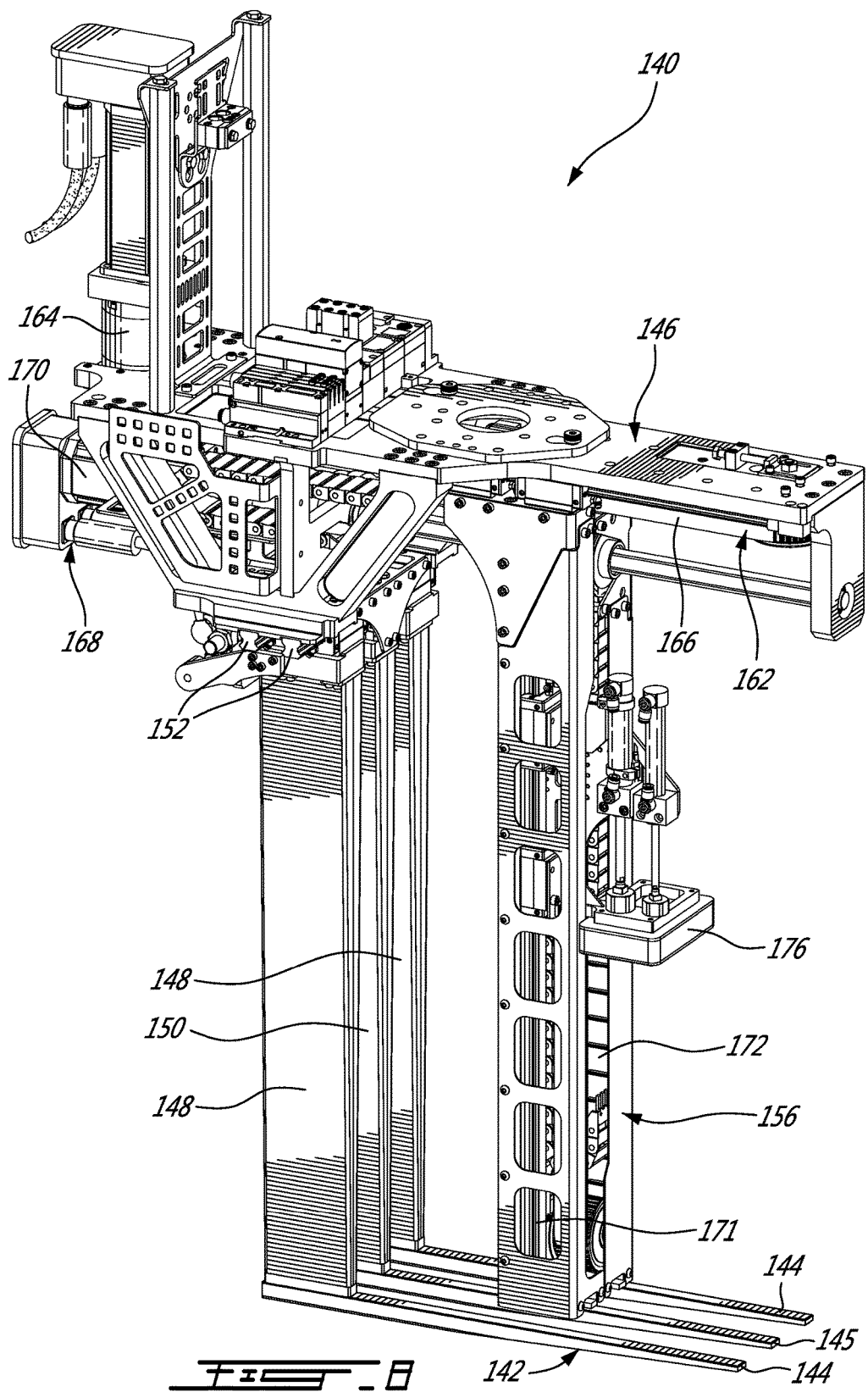

METHOD AND TOOL FOR PALLETIZING MIXED LOAD PRODUCTS

CROSS REFERENCE TO RELATED APPLICATIONS

This application is a continuation of U.S. application Ser. No. 14/704,581, having a filing date of May 5, 2015 (now U.S. Pat. No. 9,701,490 issued Jul. 11, 2017), which is a non-provisional of and claims the benefit of U.S. Provisional Patent Application No. 61/988,398, filed on May 5, 2014 the disclosures of which are incorporated by reference herein in their entireties.

FIELD

The present disclosure relates to palletizing, and more specifically to palletizing of mixed load products.

BACKGROUND

Warehouses, distribution centers and fulfillment centers typically receive full pallets of uniform products. In many cases, the products are depalletized and stored individually in a storage area. When specific orders need to be prepared, the products are transported to a palletizing cells, which can be either manual, automated or robotized.

Because of the wide variety of products, a special and versatile end of arm tool is required when the robotized approach is taken.

Typical tools to grip products are equipped with vacuum cups or pads. Such tools are economical and easy to use. While they can be used with closed boxes or cartons, they show limitations to grip trays, stretch wrapped products or the like. Problems may also occur if the top flaps of the boxes are not glued or tapped adequately. Because of the multiplication of product sizes and formats found in warehouses and distribution centers, a more robust and versatile tool is required.

The use of a fork-type tool allows solving the above-mentioned drawback. Traditionally, the bottom forks of such tools can be extended or retracted. Therefore, when a product is gripped, the bottom forks are extended to go underneath the product, while they are retracted when the product is dropped in place. This type of tool is popular, considering that it can handle virtually any type of product in a reliable fashion.

However, a first drawback of typical fork-type gripping tool relates to the width of the bottom forks. Ideally, it should be wide enough to be able to pick and handle products of various dimensions, but when it is too large, it limits the capacity to drop narrow products on the pallet considering that the wide forks might interfere with products already in place on the pallet. A second drawback is the cycle time required for a conventional fork tool to pick and place products.

U.S. Pat. No. 8,235,436 B2, issued on Aug. 7, 2012, to Ryf and being titled "Bundle Gripper for a Palletizing Machine and Method for the Palletizing of Bundles" describes a bundle gripper for a palletizing machine handling bundles, wherein a bundle is fed from a feeding device to the bundle gripper, the bundle resting against an end stop. Ryf tool has at least two gripper units, and gripper fingers that are extendable. A drawback of the tool by Ryf is that providing movable fingers renders the tool heavier and more complex, therefore requiring additional maintenance.

U.S. Pat. No. 6,579,053 B1, issued on Jun. 17, 2003 to Grams et al. and being titled "Robotic Containerization and Palletizing System" describes a robotic system using an end effector comprising a plurality of rotatable fingers designed specifically to handle trays, pallets or tubs.

The approach taken by Grams et al is dedicated to handle objects with geometry similar to trays and the like, and is therefore not suitable for palletizing mixed load products in a warehouse.

U.S. Pat. No. 8,807,912 B2, issued on Aug. 19, 2014 to Liebheit and—being titled "Infeed Station and Stack Gripper of a Palletizing System and Method for Transferring Stacks from an Infeed Station to a Stack Gripper" describes a tool and method for transferring stacks.

The approach taken by Liebheit is specific to stack handling where a stack conveyor and at least two stack chambers are used. Liebheit uses the gripper described in details in U.S. Pat. No. 8,235,436 B2 discussed above.

United States Publication No. 2010/0218464 A1, published on Sep. 2, 2010 to Baumann and being titled "Gripper for an Automated Manipulator and Method for Operation of the Gripper" describes a tool including bottom forks to secure the product from underneath, and a stop and a counter-stop to firmly hold the product on two opposite sides. This tool is designed to firmly hold a variety of products, but is not suitable for palletizing at high rates because of its multi-step sequence. Once the tool is positioned close to the product to be picked, a first motor moves the bottom forks underneath the product. The counter-stop is then lowered and finally the stop is moved forward to positively hold the product on two opposite sides. The reverse sequence is performed when placing the product on the pallet. It results that the manipulator is in a waiting position for too long and is not suitable for applications where high throughput is required.

Baumann's gripper illustrates a problem common to most known grippers, which are designed in such a way that the robot has to completely stop to enable the bottom forks to go underneath the product and then to lower the top pad to securely hold the product before the robot can start its retrieving movement to bring the picked product to the pallet.

Many systems from the prior art include an upper mobile pad or plate to secure the product from the top. One known approach is to use a servo-driven axis to lower the upper pad to the desired height. This approach is fast to modify and adapt the tool's opening from one product to the other, but does not precisely adapt to the real product's dimension because the exact dimensions of the cases are rarely their nominal values. If the real dimension is slightly higher that the nominal value, the upper pad can crush the product and possibly damage at least the packing if not the product itself. Similarly, if the product real height is less that its nominal value, the upper pad will not hold the product properly. Another approach from the prior art is to use pneumatic driven axes to move a plate to pick the product. This approach is slower compared to the one previously mentioned because the upper pad returns to the uppermost position between each product. When a small product is picked, the long downward movement increases the picking time, thus the overall cycle time. On the other hand, this approach allows applying a predetermined pressure that enables the tool to firmly hold the product without damaging the packing or the product regardless of its real dimensions.

SUMMARY

Many issues and challenges are encountered when developing a tool for mixed load palletizing. The tool has to be large enough to pick big products but slim enough to place smaller products between two previously placed products. The cycle time is also an important feature and the method used has to limit, or ideally eliminate, the waiting time of the manipulator or robot arm. Similarly, the clamping process has to be as fast as possible for similar reasons.

The problem of the lag time in picking and dropping mixed load products during a palletization process is solved by using a tool having i) a gripping member that can be partially closed in a first fast movement while it is moved by a robot towards a product and then closed onto the product in a second shorter precise movement and ii) a product abutting plate that is movable along an axis in unison with the tool in opposite direction thereof.

According to an illustrative embodiment, there is provided a tool for palletizing mixed load products, the tool comprising:

a frame for mounting the tool to a robot;

a fork assembly including a plurality of side by side and distanced product-supporting members, each mounted to the frame;

a gripping assembly having at least one gripping member mounted to the frame in a parallel relationship with the product-supporting members; the at least one gripping member being movable relative to the product-supporting members so as to vary a distance therewith; and a pusher assembly including a pusher that is mounted to the frame for longitudinal movement along the product-supporting members.

According to another illustrative embodiment, there is provided a palletizing cell comprising:

an infeed conveyor for providing mixed products to be palletized;

a pallet-receiving station; and a robot equipped with the tool as recited hereinabove, that is positioned within reach of both the infeed station and pallet-receiving station; the robot being for sequentially gripping the mixed products and for placing each gripped product on a pallet positioned at the pallet-receiving station.

According to still another embodiment, there is provided a tool comprising:

a gripping member that is partially closable in a first fast movement while the tool moves towards a product and then closable onto the product in a second movement; and a product abutting member that is movable within the gripping member in unison with the tool in opposite direction thereof.

According to a further embodiment, there is provided, a method for palletizing mixed load products using a tool mounted to a robot, the method comprising:

adjusting the width of the tool in response to a width of a selected product among products to be palletized;

the robot simultaneously moving towards the selected product to be palletized and opening a gripper assembly of the tool to a nominal height of the selected product plus an offset gap;

when the tool is positioned to start gripping the selected product, closing the gripper a distance sufficient to contact the product;

contacting the selected product with a pusher within the gripper assembly of the tool;

moving the pusher backward in synchronicity with moving the tool forward until the selected product is gripped by the tool;

moving the tool adjacent a mixed load pallet at a position selected to drop the selected product; and moving the pusher forward in synchronicity with moving the tool backward until the selected product is dropped by the tool at the selected position while the gripper assembly keeps contact with the product.

With a tool according to illustrated embodiments, the robot is not required to stop while placing a product. This is done by pushing the product while the robot moves away from the position where the product is being placed. The pushing movement is provided by a servo drive and this movement is synchronized with the robot's movement. These combined movements produce the overall effect of a product being gently placed on the pallet while the robot starts his movement to pick the next product. The same principle applies in the picking process.

Other objects, advantages and features of the tool and method for palletizing mixed load products will become more apparent upon reading the following non restrictive description of preferred embodiments thereof, given by way of example only with reference to the accompanying drawings.

BRIEF DESCRIPTION OF THE DRAWINGS

In the appended drawings:

FIG. 3b is a partial top perspective view similar to FIG. 3a, taken from the opposite side thereof;

FIG. 4 is a back elevation of the tool from FIG. 2; the tool being shown in the same configuration of FIG. 3;

FIG. 5 is a flowchart illustrating a method for palletizing mixed load products according to an illustrative embodiment;

FIGS. 6a to 6d are partial side elevations of the tool from FIG. 2 illustrating the robot withdrawing step (step 222) from FIG. 5;

FIG. 7 is a side elevation of the tool from FIG. 2, illustrating the resiliency of the gripping members;

FIG. 8 is a perspective view of a tool for mixed load palletizing according to a second illustrated embodiment;

DETAILED DESCRIPTION

Figure 1:
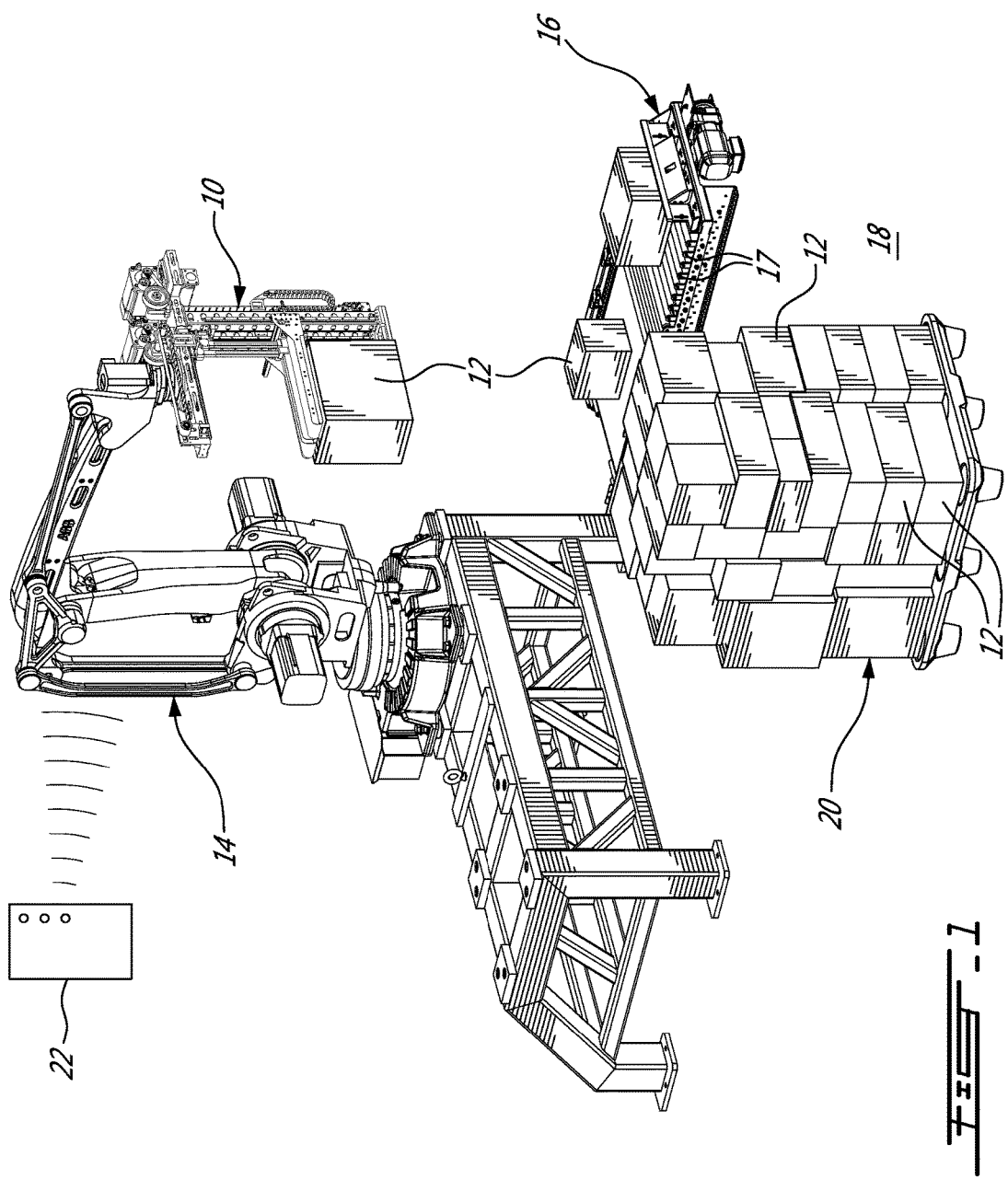
FIG. 1 is a perspective view of a palletizing cell for mixed load products, including a tool for mixed load palletizing according to a first illustrative embodiment.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A tool 10 for palletizing mixed load products 12 according to a first illustrative embodiment will now be described with reference to FIGS. 1-3.

As shown in FIG. 1, the tool 10 according to the first illustrated embodiment is operatively mounted to an industrial robot arm 14 which is positioned adjacent both an infeed conveyor 16 and a pallet receiving station 18. The ensemble of the robot 14 with tool 10, infeed conveyor 16 and pallet receiving station 18 will be referred to herein as a palletizing cell.

As an input, products 12, that can be of various sizes, arrive from the infeed conveyor 16 and each one is gripped by the tool 10 in such a way as to firmly hold it to enable fast transfer to a pallet 20 without damaging the product 12 and without relative movement between the product 12 and the tool 10. The product 12 is then released and placed on the pallet 20.

The expression "product" should be construed herein as including any type of case, carton, tray, stretch wrapped, etc.

Generally, the product is of a rectangular shape. The product dimensions may vary greatly between each different types of product. Typical dimensions (W×L×H) are between 4"×6"×2" (10.16 cm×15.25 cm×5.08 cm) and 20"×25"×24" (50.8 cm×63.5 cm×61.0 cm).

It is to be noted that the illustrated products are referred to using the same reference number 12, while they may vary in configuration and size.

The infeed conveyor 16 is in the form of a roller type conveyor. According to another embodiment (not shown), the products 12 are brought to a location within reach of the robot 14 via another type of conveyor such as a narrow belt conveyor with a pop-up mechanism between the narrow belts to lift the products. According to still another embodiment, the infeed conveyor 16 is replaced by any other means allowing products 12 to be presented to the tool 10 so as to be gripped thereby.

The pallet receiving station 18 is in the form of a cleared area within reach of the robot 14, that is sufficiently large to receive a full mixed load pallet.

The tool 10 is attached to a standard four-axis or six-axis industrial articulated robot arm 14. Equipped with the tool 10, the robot 14 is capable of securely gripping and transferring one or more products 12 from the infeed conveyor 16 to the pallet 20. A conventional robot arm can be used, such as ABB's IRB 660 or IRB 6640, FANUC's R2000 or M410, or any similar robot arm offered by other manufacturers like Kuka or Motoman.

The robot arm 14 includes other well-known systems and components that allow its operation. Since these systems and components are believed to be well-known in the art, they will not be described herein in more detail for concision purposes.

In the description and in the claim, the expressions 'robot' and 'robot arm' will be used interchangeably to mean a programmable system including articulated and/or movable members that can receive, control and move a tool.

The robot arm 14 is conventionally coupled to a controller 22 that controls the operation of the robot arm 14 and tool 10.

The expression "controller" should be construed broadly as including one or more electronic devices, including for example one or more computers that are configured with components and/or programmed with instructions that produce one or more functionalities, including communicating data and instructions with an electronic or electro-mechanical machine or device.

Figure 2:
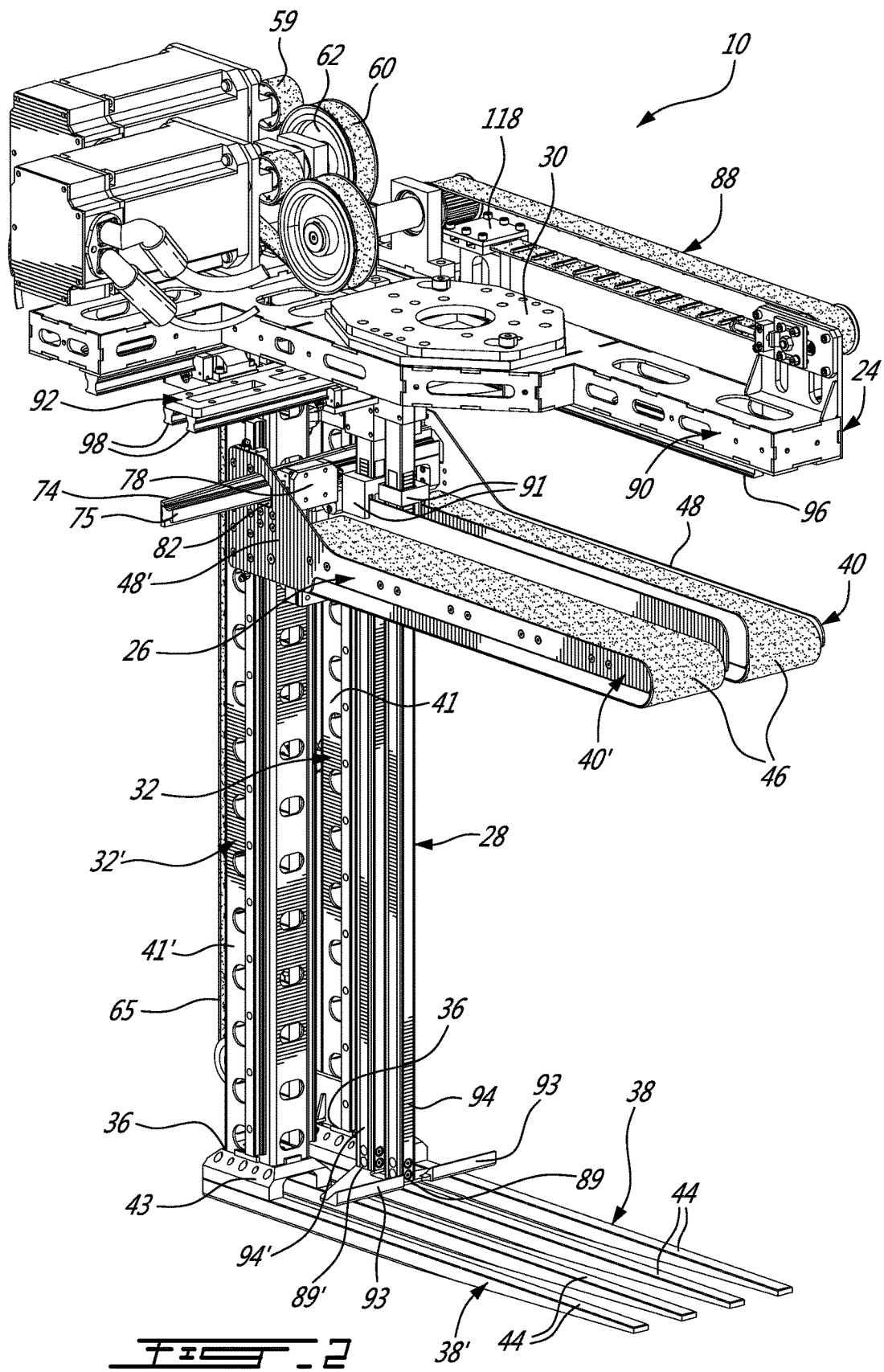
FIG. 2 is a perspective view of the tool from FIG. 1, illustrating the tool in its narrower configuration, the gripping members in their upper position, and the pusher bars in their back position.
Figure 3A:
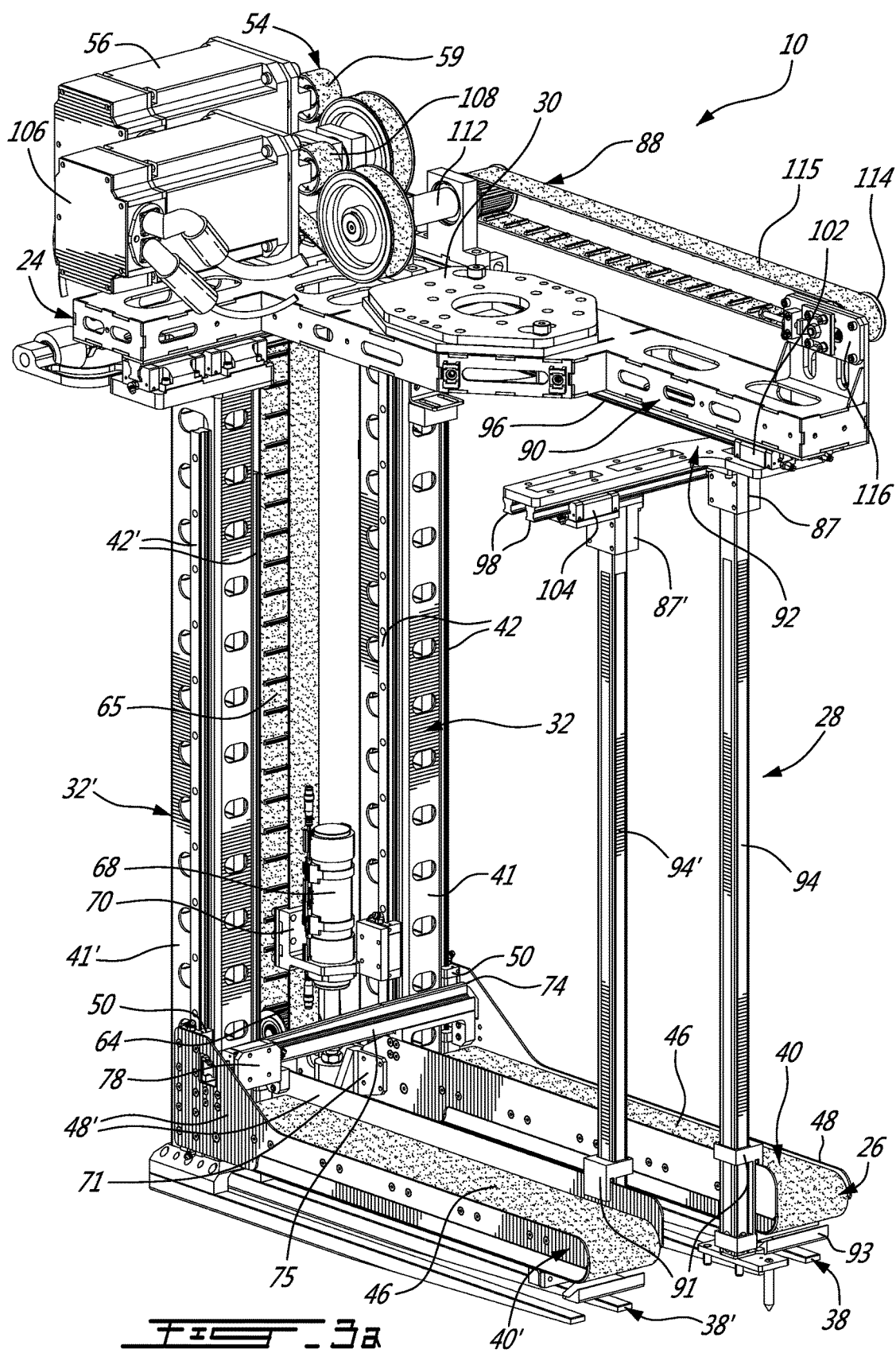
FIG. 3a is a top perspective view of the tool from FIG. 2, illustrating the tool in its wider configuration, the gripping members in their lower position and the pusher bars in a front position.
Figure 3C:
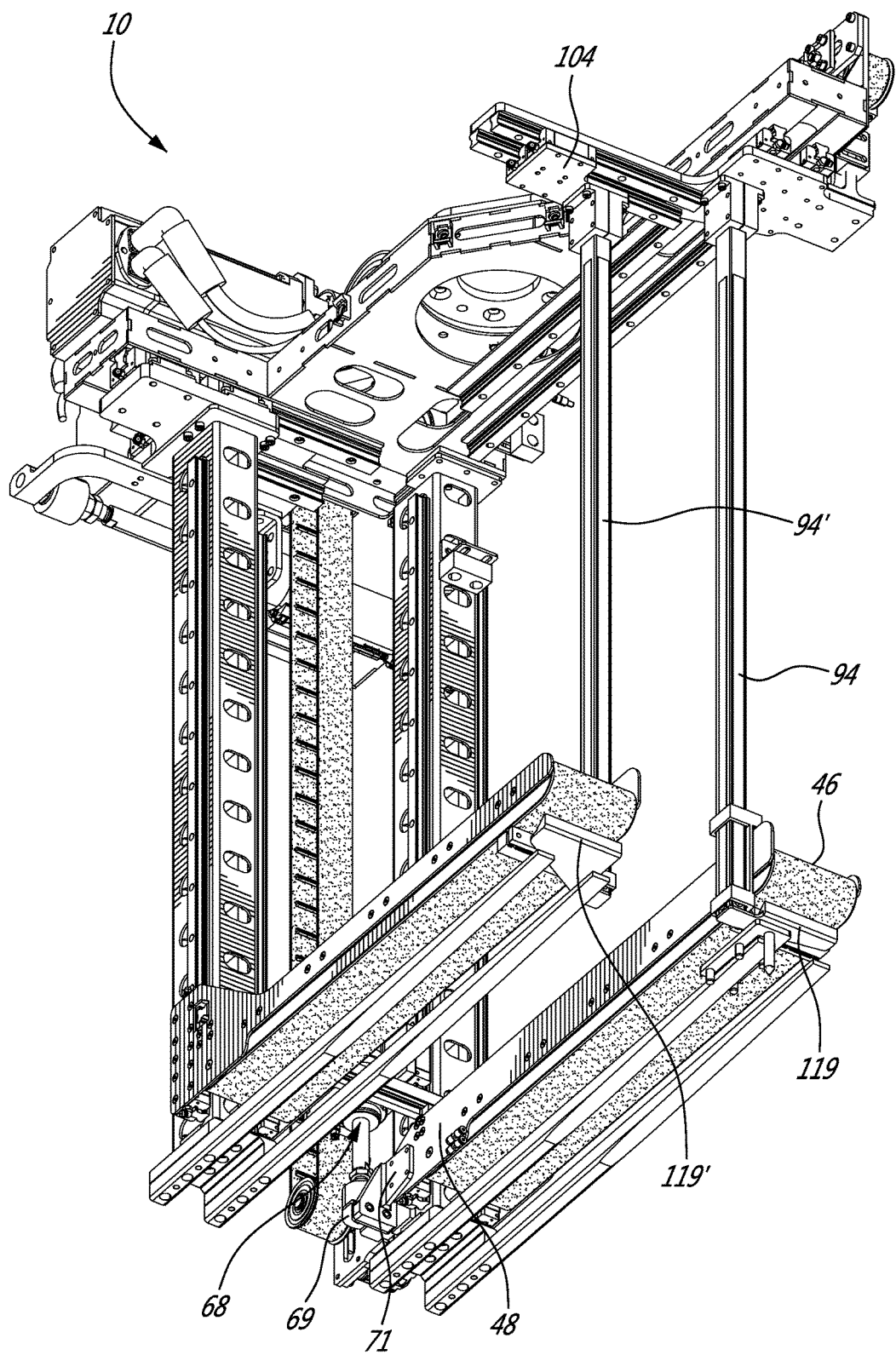
FIG. 3c is a bottom perspective view of the tool from FIG. 2, illustrating the tool in its wider configuration, the gripping members in their lower position and the pusher bars in a front position.

With reference to FIGS. 2, 3 and 4, the tool 10 will now be described in more detail.

The tool 10 comprises a frame 24, a gripping mechanism 26 and a pusher assembly 28, both mounted to the frame 24, and a width-adjusting assembly 29.

The frame 24 receives a robot-mounting bracket 30 that allows the tool 10 to be conventionally attached to the robot 14.

The gripping mechanism 26 includes two parallel first track assemblies 32-32', each extending from the frame 24 between a proximate end 34 to a distal end 36, two forks 38-38', each fixedly mounted to a respective track assembly 32-32' at the distal end 36 thereof, and two side by side gripping members 40-40', each one being mounted to a respective one of the two track assemblies 32-32' so as to extend generally perpendicularly therefrom and for movement in unison therealong. The gripping members 40-40' are maintained in parallel relationship with the fork assemblies 38-38'.

As will become more apparent upon reading the following description, parts that are referred to with a prime (') is identical to the other part identified with the same but unprimed numeral reference, the only difference is that the primed reference refers to a movable part.

Each track assembly 32-32' is in the form of a hollow rectangular post 41-41' including tracks 42-42' secured on both lateral sides thereof. The track assemblies 32-32' are not limited to hollow rectangular posts and can take any other rigid form that can receive and position an elongated track and forks 38-38'.

Each fork 38, 38' is defined by two parallel fingers 44. Each pair of fingers 44 is secured to a respective post 41-41' via a mounting bracket 43 that is fixedly mounted to the post 41-41' at the distal end 36 thereof. The fingers 44 of the two forks 38-38' extend from a respective post 32-32' so as to generally lie within a same plane that is generally perpendicular to the posts 41-41'.

The fingers 44 are beveled to ease their insertion under a product 12 as will be described furtherin.

According to another embodiment (not shown), the forks 38-38' include another number of fingers 44 than two (2), the fingers 44 have another shape than the one shown in the Figures, and/or a fork assembly is provided that includes another number of forks than two (all not shown).

Each gripping member 40, 40' includes a belt 46 that is endlessly mounted between two shoe-shaped side plates 48, 48', secured therebetween.

Each gripping member 40, 40' is slidably mounted to a respective post 41, 41'. More specifically, rail-engaging elements 50 are secured to both shoe-shaped side plates 48 and 48' near the proximate enlarged ends thereof. The distance between the facing plates 48-48' is such that the gripping members 40 and 40' remain mounted to its respective tracks 42-42' when the gripping members 40 and 40' are moved therealong.

The distance between the bottom portions of the gripping members 40-40' and the top portion of the respective forks 38-38' defines the opening of the gripping mechanism 26 and can be adjusted for the height of a given product 12. For that purpose, the position and movement of the gripping members 40-40' are servo-driven and pneumatically actuated by a first drive assembly 54.

The first drive assembly 54 includes a first drive 56 having an output shaft provided with a first pulley 58 that operatively receive an endless belt 60, that is further mounted on a second pulley 62. A roll 59, that is rotatably mounted to the frame, is provided to tension the belt 60. The pulley 62 is mounted to a first end of a shaft, and a driven gear 64 is provided at its other end. The driven gear 64 is rotatably mounted to the frame 24 and receives an endless timing belt 65.

The coupling assembly 70 operatively couples the timing belt 65 to the track 42 of the fixed post 41. Another coupling assembly 71 operatively couples the distal end 69 of the pneumatic actuator 68 to side plate 48. The horizontal bar 74 is coupled to the gripping assembly 40-40' as can be better seen from FIG. 3a.

A horizontal bar 74, that is secured to the gripping member 40 on the side of the fixed post 41 and that is slidably received by the other gripping member 40, forces both gripping members 40-40' to slide along the track assemblies 42-42' in unison when the drive assembly 54 is actuated.

The width-adjusting assembly 29 allows moving the tool 10 between two specific width configurations, a narrow and a wide configuration, depending on the size of each product 12 to pick. More specifically, the width-adjusting assembly 29 allows moving and maintaining the distance between the movable post 41' and the fixed post 41, and therefore between the gripping members 40 and 40' and between the forks 38 and 38'.

The width-adjusting assembly 29 includes top and bottom cursors 76 and 78 that receive respective horizontal tracks 80 and 75. The track 75 is fastened to the horizontal bar 74. The top horizontal tracks 80 is fixedly mounted to the frame 24 thereunder and the top cursor 76 is slidably mounted to the tracks 80 and fixedly mounted to the movable post 41'. The bottom track 75 is fixedly mounted to the gripping member 40 and the bottom cursor 78 is fixedly mounted to the other gripping member 40' and slidably mounted to the track 75. A slot 82 is provided in the exterior side plate 48 of this other gripping member 40' to allow passage for the horizontal bar 74 and bottom track 75 when the movable gripping member 40' is moved towards the other gripping member 40.

The width-adjusting assembly 29 further includes a pneumatic cylinder 84 mounted to the frame near the fixed post 41. Extending or retracting the cylinder rod 86 allows modifying the width of the tool 10.

The pusher assembly 28 will now be described in more detail. As will become apparent upon reading the following description, the pusher assembly 28 defines a product abutment, that extends generally perpendicularly to both the forks 38-38' and the gripping members 40-40' therebetween, and whose longitudinal position along the forks 38-38' is movable in unison with the displacement of the tool 10 in opposite direction thereof.

The pusher assembly 28 includes a third track assembly 90, including tracks 96 that extend generally parallel to the forks 38-38', two pusher bars 94-94' that are mounted to the tracks 96 via a pusher bar holder 92 and a second drive assembly 88 for moving the pusher bar holder 92 in the tracks 96 therealong.

The pusher bar holder 92 is slidably mounted to the tracks 96 via a cursor 102 fixed to the pusher bar holder 92. The holder 92 includes tracks 98 that are oriented perpendicular to the gripping members 40-40'.

The proximate end 87 of the pusher bar 94 is fixedly mounted to the pusher bar holder 92. The proximate end 87' of the pusher bar 94' is 'slidably mounted in the tracks 98 via a cursor 104 for movement therealong. The pusher bars 94 are further slidably mounted to the inner side plate 48 of the gripping member 40 via hollow brackets 91 for free movement along the gripping members 40-40' and also so as to allow transversal movement of the gripping members 40-40' along the pusher bars 94-94'. The brackets 91 are slidably mounted to the inner side plates 48.

The distal ends 89 of the pusher bars 94 are provided with fingers 93 that extend laterally from the pusher bars 94-94', perpendicularly therefrom in opposite directions. The length of these two fingers 93 are such that they do not extend beyond the forks 38 and gripping members 40 when the gripping member 40' and fork 38' are positioned closer to the other corresponding assembly 40 and fork 38.

The second drive assembly 88 includes a drive 106 having an output shaft provided with a pulley 107 that is operatively coupled to an endless belt 109. The endless belt 109 is coupled to the pulley 111. A roller 108, that is secured to the frame 24, is provided to tension the belt 109. The pulley 111 is coupled to the pulley 113 via the coupling shaft 112, who is coupled to the timing belt 115. The other end of the endless belt 115 is mounted to a pulley 114 that is rotatably mounted to the frame 24 via a mounting bracket 116. The cursor 102 is attached to the belt 115 via a clipping assembly 118 for movement of the holder 92 in unison with the belt 115.

In operation of the pusher assembly 28, the longitudinal position of both pusher bars 94-94' along the gripping members 40-40' is controlled by the drive 106, the bar 94' moves laterally in unison with the gripping member 40' when the width of the tool 10 is adjusted for the width or length of the product 12 to pick, and the gripping members 40 and 40' are free to move along the pusher bars 94-94' to adjust for the height of the product 12.

When the pusher assembly 28 is moved by the second drive assembly 88, the belts 46 follow the movement of the pusher assembly 28 in unison. The pusher bars 94 and 94' are attached to the belts 46 with clipping assemblies 119 and 119' (see on FIG. 3c).

The operation of the robotic cell of FIG. 1 will now be described with FIGS. 1-4 and 6a-6d and with reference to FIG. 5 that describes a depalletizing method 200 according to an illustrative embodiment.

In step 202, the robot 14 receives instructions to pick a product 12 on the infeed conveyor 16, and nominal dimensions of the product 12 is received by the robot controller 22 (step 204).

The nominal dimensions of the product 12 can be received by the controller 22 as the product 12 arrives on the conveyor 16 or it can be sent thereto in batch for a given number of products 12 that are known to sequentially arrived on the conveyor 16. Also, the nominal dimensions can be provided for example by the manufacturer of the product or measured using a vision system or else (not shown).

The controller 22 activates the width-adjusting assembly 29 so that the width of the tool 10 is slightly less than the nominal width or length of the product 12 (step 206). More specifically, when the product dimensions are less than a predetermined value, the tool 10 is configured to its narrow configuration, and, when the product dimensions are more than a predetermined value, the tool 10 is configured to its wide configuration. After step 206 or at the same time, the pneumatic actuator 68 is extended to lower the two gripping member 40-40' along the vertical track assemblies 32-32' as the robot 14 approaches the infeed conveyor 16 (step 208).

The first drive 56 lowers the gripping members 40-40' along the vertical track assemblies 32-32' to yield a distance between the forks 38-38' and the belts 46 equivalent to the product's 12 nominal height plus an offset (step 210).

Steps 206-210 can be performed at the same time the robot 14 positions the tool 10 to start the gripping process (step 212).

As the forks 38-38' begin their insertion underneath the product 12 by the movement of the robot arm 14, the first drive 56 again lowers the gripping members 40-40' along the vertical track assemblies 32-32' to have a positive contact between the belts 46 and the product 12 (step 214).

Then, (in step 216) as the robot arm 14 moves the forks 38-38' underneath the product 12, the second drive 106 moves the pusher bar holder 92 along the horizontal track 96 in a synchronous movement. By this action, the pusher bars 94 move backward as the tool 10 moves forward. Since the pusher bars 94 are mechanically attached to the belts 46 with the clipping assemblies 119-119', the later move in unison with the pusher bars 94, therefore keeping a positive contact between the belts and the product 12. When the forks 38-38' are properly positioned under the product 12, the first drive 56 lowers the gripping members 40-40' to firmly hold the product 12. At the end of this step, the product is gripped by the tool 10 (step 218).

The robot controller 22 then instructs the robot 14 to position the gripped product 12 in a predetermined location on the mixed load pallet 20 (step 220).

When this location is reached by the tool 10, the robot controller 22 instructs the second drive 106 to move outwardly in order to push the product 12 with the pusher bars' 94-94' while the robot 14 starts its retracting movement in a synchronous fashion to prepare itself for the next product 12 to be picked. Since the pusher bars 94-94' are mechanically attached to the belts 46 with the clipping assemblies 119-119', the later move in a synchronous fashion with the movement of the tool 10, therefore keeping a positive contact between the belt 46 and the product 12 (step 222).

FIGS. 6a-6d illustrate in more details step 222. It is to be noted that FIGS. 6a-6d show the tool 10 gripping another product than the box from FIG. 1.

When the tool 10 is positioning the product 12 in the proper position on the pallet 22, the drive 106 starts moving the pusher bar holder 92 along the horizontal track 96 (see arrow 120 in FIG. 6a) as the robot 14 starts its withdrawing movement (see arrow 122) in a synchronous fashion. As previously mentioned, the belts 46 also moves in a synchronous movement with the product 12 being placed (see arrow 124). It is to be noted that the belts 46 are not motorized and are caused to move in unison with the pusher bars 94-94' because of the clipping assemblies 119-119'. These synchronous movements causes the product 12 to stay at the same location on the pallet 20, while the tool 10 withdraws (see FIG. 6b).

As we can see in more details in FIG. 6c, the gripping members 40-40' are slightly longer that the forks 38. Therefore, when the pusher bars 94 are at the end of their travel, the product 12 is no longer supported from underneath by the forks 38. At this moment, because of the previously activation of the actuator 68, the gripping members 40-40' push down the product 12, (see arrow 126 in FIG. 6d), forcing it to sit properly on the pallet 20 or on previously palletized products 12. It is to be noted that this step is performed in a very short period of time as the above-mentioned withdrawal of the robot 14 corresponds to the beginning of its movement to pick the next product 12.

When the palletizing process is completed, the gripping members 40-40' are moved upward (step 224) and the robot arm 14 can immediately move to get the next product 12 to be picked (step 202). The process 200 is then repeated for each new product 12 on the infeed conveyor 16.

FIGS. 3 and 4 illustrate the tool 10 while the actuator 86 is in the extended position, while FIG. 2 illustrates the tool 10 while the actuator 86 is in the retracted position. For example, when a product 12 to be picked is less than a predetermined dimension, the tool is in the retracted position of FIG. 2. Since the fork 38' and the movable gripping member 40' are coupled, both move together in unison with the actuator 86.

Similarly, since the pusher bar 94' is associated with the gripping member 40', both move in unison with the actuator 86.

FIG. 7 illustrates the resiliency of the belts 46 which allows irregular shaped products such as bottles 130 to be safely gripped while keeping its functionality described above because of the presence of a foam material supporting the belts 46.

According to another embodiment, the foam material is replaced by rubber, or another material. According to still another embodiment, the foam material is omitted.

In most application, the infeed conveyor 16 is in the form of a roller type conveyor. Providing forks 38 as the bottom support of the tool 10 allows inserting the bottom support underneath the product 12 and between the rollers 17 of the infeed conveyor 16.

The widths of the product 12 coming on the infeed conveyor 16 may vary greatly. As the mixed load pallet 20 is being built, products 12 of different sizes and geometries are positioned on the pallet 20. Adjusting the width—of the tool 10 so that it is narrower than the product 12 that is being palletized. allows avoiding collisions between the tool 10 and already positioned products 12 on the pallet 20.

Providing the tool 10 with pusher bars 94 that are movable in unison with the tool 10 but in opposite direction thereof enables picking the product 12 and then placing the product 12 on the pallet 20 without stopping the robot's movement. This allows maximizing throughput.

Providing gripping members including belts 46 that move in unison with the pusher bars 94 enables a better control of the product gripping and dropping processes, minimizing the possibility of product tipping.

Using a combined servo driven and pneumatic actuated gripping members 40-40' allows adapting the tool 10 to the product's height without imposing any delay in the picking process or damaging the products 12. The drive assembly 54 allows maximizing speed by using the servo drive 56 to position the gripping members 40-40' close to their clamping position and then using the compliance feature obtained with the pneumatic actuator 68 to actually clamp a product 12.

The tool 10 allows simultaneously picking two products 12. When two products 12 are picked, each one is clamped between one fork 38, 38' and one gripping member 40, 40' enabling secure holding of both products 12. The tool 10 can also pick two or more products in a perpendicular fashion, the products' length being perpendicular to the main axis of the gripping members 40-40' and the forks 38-38'.

The drive assemblies are not limited to the illustrated embodiment and can be modified in any way allowing to yield the same functionalities. As one example of a possible modification, the pneumatic actuators can be replaced by other actuating means. Also the belt assembly can be replaced by other mechanical movement transmission assemblies.

Any one of the illustrated tracks can be substituted with any type of linear guided slide or bearing.

The number and configuration of the gripping members 40 and 40' can also differ to those illustrated. For example, the belts 46 can be replaced by a low friction material for the gripping members 40.

Figure 9:
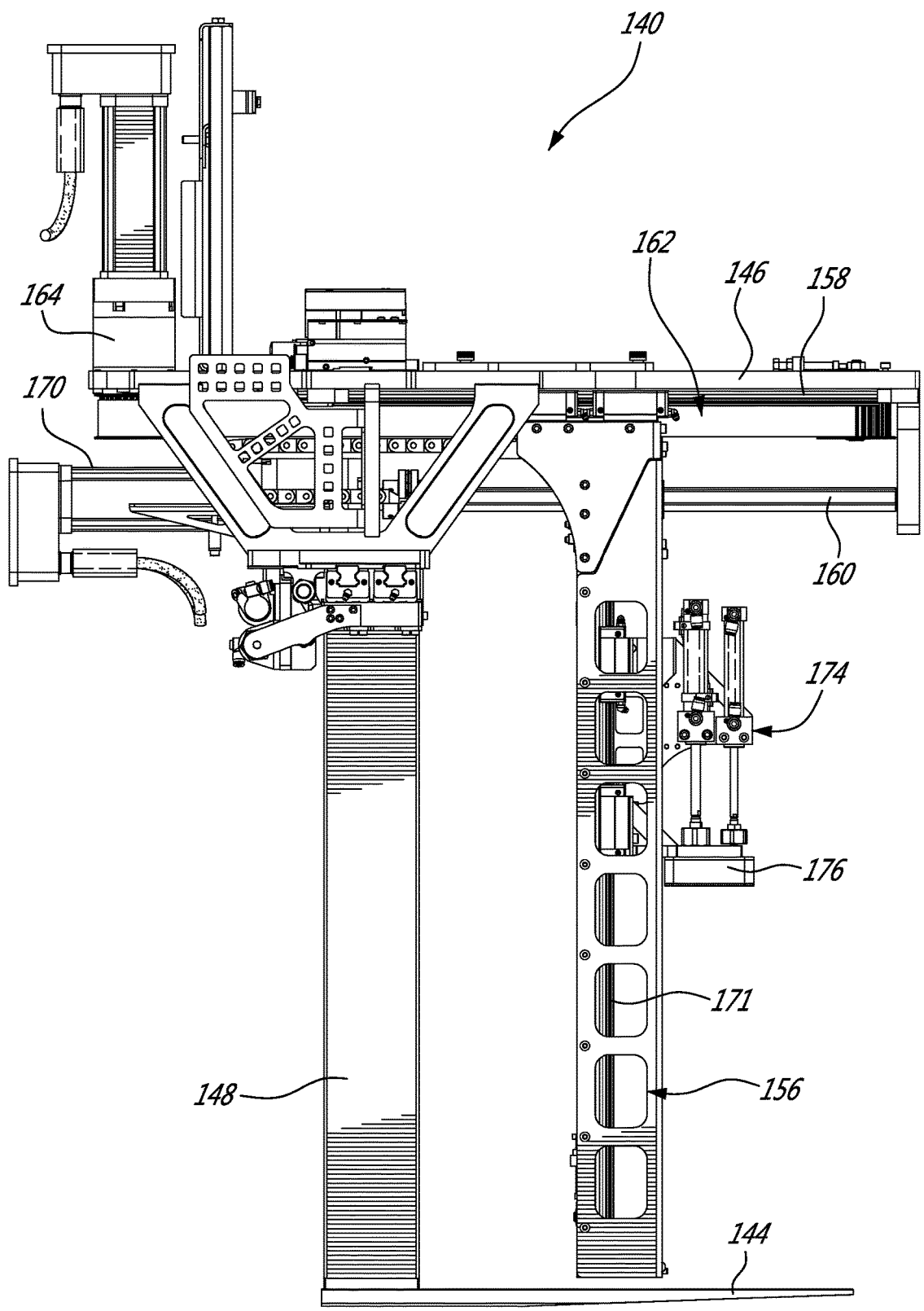
FIG. 9 is a side elevation of the tool from FIG. 8.

With reference to FIGS. 8 and 9, a tool 140 for palletizing mixed load products according to a second illustrating embodiment will now be described in more detail. Since the tool 140 is similar to the tool 10, only the differences therebetween will be described hereinbelow in more detail for concision purposes.

The tool 140 comprises a fork 142 having three fingers 144 and 145 mounted to the frame 146 via tapered beams 148 and 150 so as to extend perpendicularly therefrom. The center beam 150 is fixedly mounted to the frame 146 and the two side beams 148 are mounted to the frame 146 for lateral movement relative to the center beam 150.

More specifically, the beams 148 are mounted to tracks 152 and their lateral distance from the center beam 150 can be modified via the actuators 154.

The tool 140 further comprises a pusher assembly 156 of fixed dimensions. The pusher assembly 156 is mounted to the frame 146 via a track 158 for slidable movement along the center finger 145. The displacement of the pusher assembly 156 is driven by a first drive assembly 162 that includes first drive 164, first endless belt assembly 166 and associated pulleys.

A pad 176, that forms a gripping element with the fork 142, is mounted to the pusher assembly 156 via a track 171 for slidable movement therealong. The longitudinal movement of the pad 176 in the track 171 is driven by a second drive assembly 168 that includes a second drive 170, a spline shaft 160, an endless belt assembly 172 and actuator 174.

As the robot 14 is instructed to pick a product 12, the robot controller 22 activates the first actuator 154 to position the outer forks 144 to yield the proper width for the tool 140 to the retracted or extended position, depending of the product's dimension. The robot controller 22 activates the second actuator 174 to lower the top pad 176. Also, the second drive 170 positions the pad 176 to a specific distance between the forks 144-145 and the pad 176 equivalent to the product's nominal height added to an offset. As the robot 14 inserts the forks 144 underneath the product 12, the pusher assembly 156 is moved backwards by the first drive 164 in unison with the robot's movement and the pad 176 is lowered to be in contact with the top surface of the product. When the forks 144 are properly positioned under the product 12, the first drive 164 lowers the pad 176 to firmly hold the product 12.

When the robot 14 is instructed by the controller to position the product 12 on the mixed pallet 20, the following sequence is performed. The robot controller 22 instructs the robot 14 to position the product 12 to be placed in a predetermined location on the mixed load pallet 20. When this location is reached, the robot controller 22 instructs the first drive 164 to move outwardly the pusher assembly 156 in order to push the product 12 out of the tool 140 while the robot 14 starts its retracting movement to prepare itself for the next product 12 to be picked. The pad 176 maintains its pressure on the product 12 and is activated upward only when the product 12 is completely out of the tool 140.

As the robot 14 moves to approach the next product 12 to be picked, the palletizing process is repeated.

Figure 10:
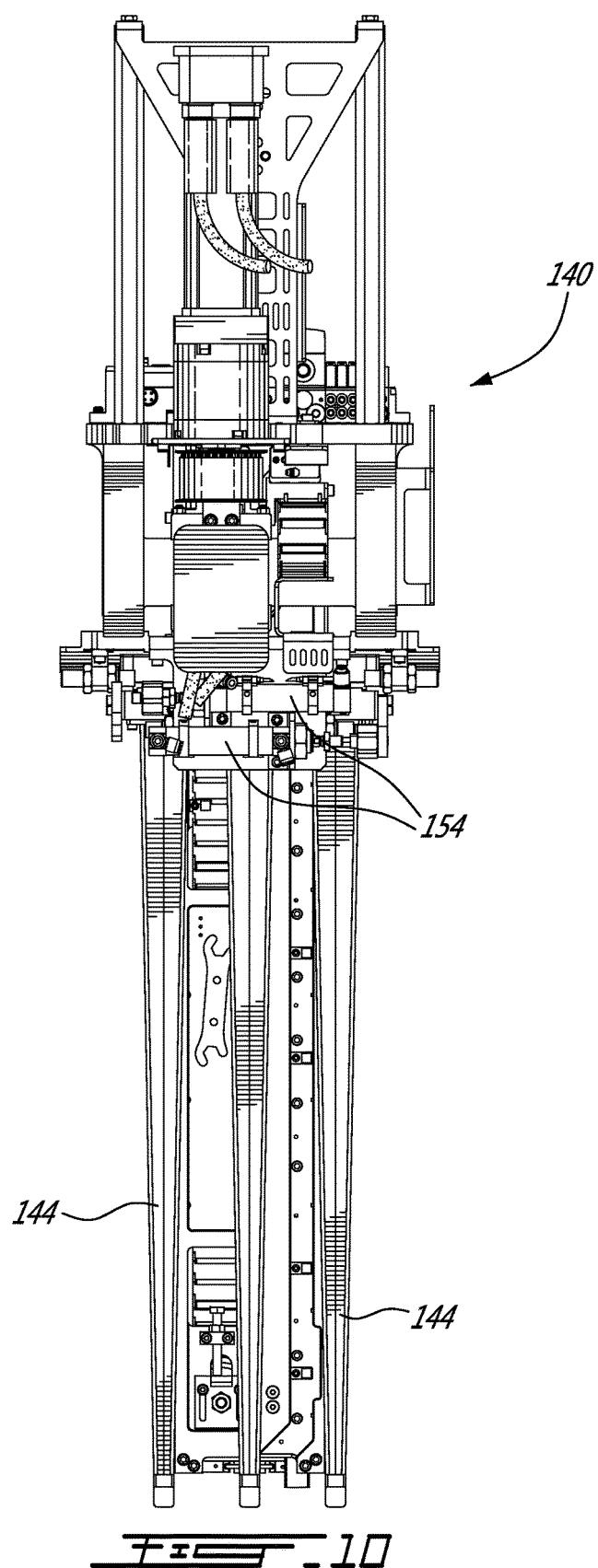
FIGS. 10 and 11 are back elevations of the tool from FIG. 8, respectively showing the forks in their narrow and extended configuration.
Figure 11:
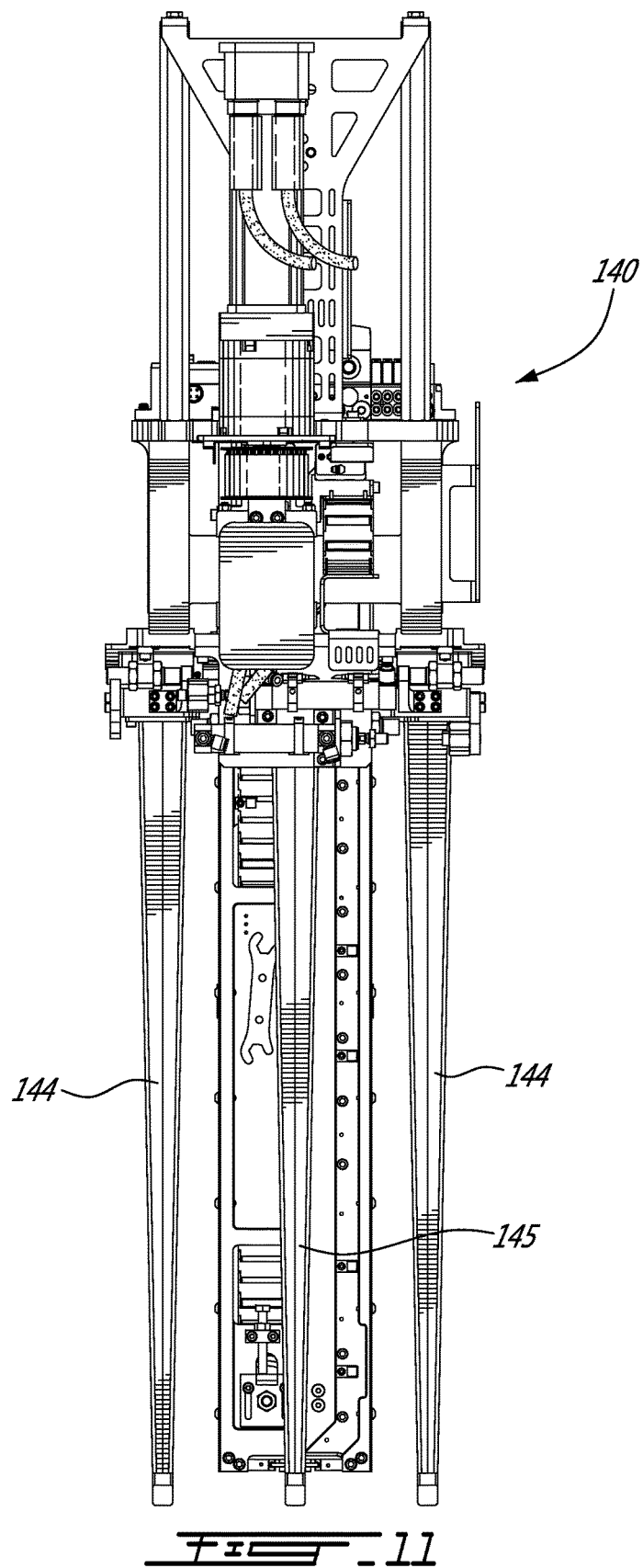

FIGS. 10 and 11 illustrate the two positions of the forks 144. When the product 12 to be picked is less that a predetermined dimension, the outer forks 144 are in the retracted position shown in FIG. 10. Consequently, when the products 12 widths (or lengths) to be picked are equal or greater than a predetermined dimension, the outer forks 144 are in the extended position shown in FIG. 11.

As it can be appreciated by reading the above description of illustrated embodiments, the method 200 for picking and then placing a product enables a product to be picked without putting the robot 14 in a waiting mode, therefore reducing the cycle time, as the tool's pusher bars or pusher assembly move backward as the tool 10 or 140 inserts the forks underneath the product. Similarly, the present method 200 and tools 10, 140 enable the product 12 to be placed on the mixed pallet without putting the robot 14 in a waiting mode, also reducing the cycle time, since the tool's pusher bars or pusher assembly move forward as the robot 14 retrieves the forks.

It is to be noted that many other modifications could be made to the tools 10 and 140 for palletizing mixed load products described hereinabove and illustrated in the appended drawings. For example:
- the robot arm 14 can be replaced by a gantry type equipment or any other similar means;
- the product to palletize can be placed on an output conveyor, a table, a platform, an AGV (automated guided vehicle) or any other means that can accepts the product;
- the tool is not limited to include three or four forks. According to another embodiment, the tool includes another number of forks, bars, or any other to shaped bottom support allowing picking a product on a roller conveyor or on another type thereof.

It is to be understood that embodiments of the tool and method for palletizing mixed load products are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

What is claimed is:

1. A tool for palletizing mixed load products, the tool comprising:
   a frame for mounting the tool to a robot;
   a fork assembly including a plurality of side by side and distanced product-supporting members, each mounted to the frame;
   a gripping assembly having at least one gripping member movably mounted to the frame and having an elongated shape aligned with the product-supporting members, the at least one gripping member being movable in opposing relation with respect to the product-supporting members, the at least one gripping member including a traction surface movable in a direction along the product-supporting members; wherein movement of the at least one gripping member in opposing relation with respect to the product-supporting members is both servo-driven and compliantly actuated; and a pusher assembly including a pusher movably mounted to the frame for longitudinal movement along the product-supporting members.

2. The tool as recited in claim 1, wherein the longitudinal movement of the pusher along the product-supporting members is synchronized with a translation of the tool in opposite direction thereof.

3. The tool as recited in claim 2, wherein the pusher assembly further includes a drive assembly coupled to a controller of the robot for causing and synchronizing the longitudinal movement of the pusher along the product-supporting member.

4. The tool as recited in claim 1, wherein the at least one gripping member includes first and second gripping members, both gripping members being slidably mounted to the frame, the second gripping member being coupled to the first gripping member for reciprocal movements in unison towards and away from the fork assembly.

5. The tool as recited in claim 4, wherein the first and second gripping members are both longer than the product-support members.

6. The tool as recited in claim 1, wherein the traction surface is a first traction surface, the gripping assembly further includes a drive assembly including a drive mounted to the frame and having an output shaft that is operatively coupled to the pusher assembly via a second traction surface, the first traction surface being operatively coupled to the second traction surface for movement in unison via the pusher assembly.

7. The tool as recited in claim 6, wherein the at least one gripping member includes a first gripping member and a second gripping member, both gripping members being slidably mounted to the frame, the first gripping member being operatively coupled to the drive assembly, the second gripping member being coupled to the first gripping member for sliding movements in unison.

8. The tool as recited in claim 1, wherein the at least one gripping member is slidably mounted to the frame via at least one track that extends between the frame and the fork assembly generally perpendicular from the at least one gripping member.

9. The tool as recited in claim 1, wherein the product-supporting members are secured to the frame via posts, at the distal end thereof, the posts being secured to the frame at their proximate end.

10. The tool as recited in claim 1, wherein the product-supporting members are bevelled.

11. The tool as recited in claim 1, wherein the product-supporting members are forks.

12. The tool as recited in claim 1, wherein the product-supporting members include a side product-supporting member at each lateral end side of the fork assembly, the tool further comprising a width-adjusting assembly mounted to the frame and being coupled to the fork assembly for modifying a distance between at least one of the side product-supporting members and other product-supporting members.

13. The tool as recited in claim 12, wherein the at least one gripping member includes a first gripping member and a second gripping member, each one of the first gripping member and the second gripping member being coupled to a respective side product-supporting member, the first gripping member being coupled to the at least one of the side product-supporting members for lateral movement in unison.

14. The tool as recited in claim 13, wherein the pusher includes a first pusher bar and a second pusher bar, each one of the first pusher bar and the second pusher bar being coupled to a respective one of the first gripping member and the second gripping member for the lateral movement in unison, the first pusher bar and the second pusher bar being further coupled to the first gripping member and the second gripping member respectively so as to allow a sliding movement of the first gripping member and the second gripping member along the first pusher bar and the second pusher bar.

15. The tool as recited in claim 14, wherein the first pusher bar and the second pusher bar are mounted to the frame via a pusher holder, the pusher holder being mounted to the frame for longitudinal movement along the product-supporting members, one of the first pusher bar and the second pusher bar being fixedly mounted to the pusher holder and the other of the first pusher bar and the second pusher bar being slidably mounted to the pusher holder for transversal movement relative to the first gripping member and the second gripping member.

16. The tool as recited in claim 14, wherein the width-adjusting assembly further including a pneumatic cylinder mounted to both posts therebetween.

17. The tool as recited in claim 13, wherein each pair of coupled side product-supporting member and gripping member is mounted to a respective post, the distance between the at least one of the side product-supporting member and the other product-supporting members is modified by moving one of the posts relative to the other post.

18. The tool as recited in claim 1, wherein the slidable movements of the at least one gripping member are sequentially servo driven and pneumatically actuated.

19. A palletizing cell comprising:
an infeed conveyor for providing mixed products to be palletized;
a pallet-receiving station; and
a robot equipped with the tool as recited in claim 1, that is positioned within reach of both the infeed station and pallet-receiving station; the robot being for sequentially gripping the mixed products and for placing each gripped product on a pallet positioned at the pallet-receiving station.

20. The palletizing cell as recited in claim 19, wherein the infeed conveyor is a roller type conveyor.

21. The palletizing cell as recited in claim 20, wherein the robot is a four or six axis articulated robot arm.

22. A method for palletizing mixed load products using a tool mounted to a robot, the method comprising:
adjusting a tool width in response to a width of a selected product among products to be palletized;
moving the robot, coincident at least in part with adjusting the tool width, towards the selected product and opening a gripper assembly of the tool to a nominal height of the selected product plus an offset gap;
with the tool positioned to overlap the selected product at least in part, closing the gripper assembly a distance sufficient to contact the selected product;
contacting the selected product with a pusher within the gripper assembly of the tool;
moving the pusher in a first direction synchronously with moving the tool in an opposite direction relative to the pusher moving in the first direction so that the selected product is gripped by the tool;
moving the tool adjacent a mixed load pallet at a position selected to drop the selected product; and
moving the pusher in a second direction synchronously with moving the tool in an opposite direction relative to the pusher moving in the second direction so that the selected product is released by the tool at the selected position while the gripper assembly keeps contact with the selected product.

23. The method as recited in claim 22, wherein said adjusting the tool width is performed simultaneously to moving the robot towards the selected product and opening a gripper assembly of the tool to a nominal height of the selected product plus an offset gap.

24. The method as recited in claim 22, wherein two or more products are gripped and released in one sequence.

* * * * *